Figure 1:
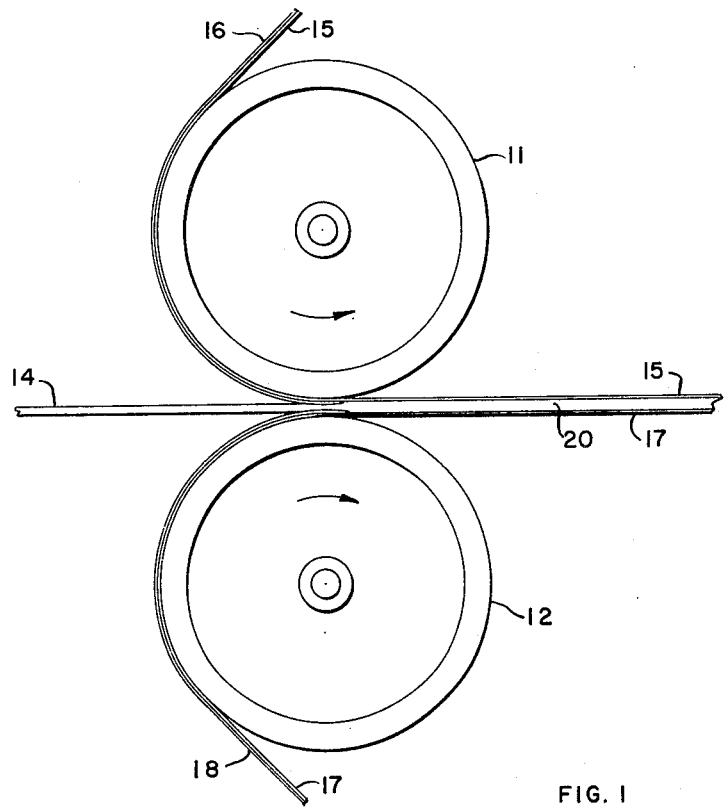

March 24, 1970     H. FRIELINGSDORF     3,502,532

METHOD FOR THE MANUFACTURE OF LAMINATE ARTICLES

Filed March 21, 1966

INVENTOR:
HANS FRIELINGSDORF

BY: *Martin S. Baer*

HIS ATTORNEY

United States Patent Office 3,502,532
Patented Mar. 24, 1970

3,502,532
METHOD FOR THE MANUFACTURE OF LAMINATE ARTICLES
Hans Frielingsdorf, Delft, Netherlands, assignor to Shell Oil Company, New York, N.Y., a corporation of Delaware
Filed Mar. 21, 1966, Ser. No. 535,956
Int. Cl. B32b *3/26, 5/18;* C09j *7/00*
U.S. Cl. 156—309         4 Claims This invention relates to a method for the manufacture of laminates comprising at least one layer of a paper product and at least one layer of a foamed thermoplastic vinyl-aromatic polymer; these articles are herein designated paper/plastic-foam laminates.

A method for producing paper/plastic-foam laminates by passing films or sheets of a foamed thermoplastic vinyl-aromatic polymer, obtained by extrusion, along a roll or guide face by means of which a layer of adhesive-coated paper is pressed against the foam is known from U.S. Patent 2,917,217 to Sisson. In that patent it is proposed to combine the components by means of an adhesive, specifically one based on a vinyl acetate polymer. Such glues are generally applied to paper in the form of dilute aqueous latex. If the paper, after application of the glue, is not dried prior to lamination, surface deficiencies tend to occur in the laminate, due to the water. This tendency can be avoided by introducing a drying step prior to the lamination step, thus complicating the method. Another disadvantage of the use of polyvinyl acetate glue lies in the unpleasant odor of this material, which makes paper/plastic-foam laminates manufactured therewith undesirable as packaging for foodstuffs.

In accordance with the present invention, paper/plastic-foam laminates which posses a low degree of brittleness and good foldability are produced from vinyl-aromatic polymer foams having a particularly low density and small cell size by laminating these with a paper coated with heat-softened compatible thermoplastic vinyl aromatic polymer. Critical conditions for effectively applying this method are disclosed below.

The present invention comprises a method for the manufacture of paper/plastic-foam laminates by passing extruded films or sheets of a foamed thermoplastic vinyl-aromatic polymer composition along a roll or guide face by means of which a layer of paper coated with heat-softened compatible thermoplastic vinyl-aromatic polymer composition is pressed against the foam. The thickness of the polymer coating on the paper is not more than 0.2 mm. The coated paper is at a temperature which is sufficiently high to cause ready adhesion of the polymer to the foam, but not sufficiently high to cause substantial deterioration of the foamed structure. The resulting product, in section, does not show a separate adhesive layer, unlike a glued laminate.

The use of a polymer coating having a thickness of not more than about 0.2 mm. is critical for this method. Paper provided with a thicker polymer coating heated sufficiently to result in adhesion has such a great heat content that when the paper is affixed to the foam an undesirable deterioration of the fine cellular foam structure occurs. This results in loss of the favorable flexibility, i.e., lack of brittleness, of the laminate and of the good foldability which is obtained when proceeding according to this invention.

In order to maintain the heat content of the coated paper as low as possible, it is desirable to keep the thickness of the coating on the paper below 0.07 mm.

In the preferred mode of this invention in which the plastic foamed is polystyrene and the polymer employed as an adhesive is also polystyrene, the following conditions are particularly preferred:

Temperature of roll—130–170° C.
Contact angle of the paper on the roll—30–80°.
Lamination speed—ca. 3 m./min.
Thickness of paper—ca. 0.2 mm.
Weight of paper per unit of area—ca. 200 g./m.$^2$.
Thickness of foamed plastic—0.5–10 mm.
Density of foamed plastic—50–120 g./l.

The paper weight and thickness may vary in the range ordinarily found for kraft papers.

The conditions are, of course, interchangeable in that the temperature of the roll and the contact angle of paper on the roll, together with the lamination speed, must be such that in combination they result in sufficiently softening the polymer coating to result in adhesion while at the same time not heating it excessively high to a temperature at which it would cause destruction of part of the foamed structure and in a non-cellular polymer layer of excessive thickness, which would impart undesirable brittleness.

For example, it was found that when paper was coated with polystyrene of a thickness between 0.2 and 0.25 mm., and lamination was carried out at a laminating speed of 3 m./min. on equipment such as described in the example below, the roll temperature required in order to obtain good bonding of the paper and the polymer was 200° C. The coated paper was found to have such a high heat content that it resulted in collapse of the top layer of the foam. The resulting laminate showed a compact fusion layer between the paper and the foamed polymer which was almost twice the thickness of the coating layer on the paper. This reduced the effectiveness of the foamed layer and introduced undesirable brittleness. It will be readily apparent that in each instance the conditions must be adjusted to result in satisfactory adhesion without resulting in the excessive collapse of foam and excessive thickness of the unfoamed layer. These conditions can be readily determined Satisfactory conditions are assured by remain- within the maximum thickness of adhesive layer as stated above.

With the method according to the invention, laminates are obtained the paper of which adheres in a particularly even manner to the foam; corrugations, blisters, bumps, creases and similar defects which are caused by uneven adhesion are totally absent. Moreover, this adhesion between paper and foam is particularly strong so that it is difficult subsequently to detach the paper from the foam again. This strong adhesion results from the fact that when the paper is affixed to the foam, the polymer of the adhesion coating partially coalesces or fuses with the polymer of the cell walls in the foam. The result is that the manufactured product does not possess a separate layer of adhesive recognizable as such, in contradistinction to the use of conventional adhesives or glues, including polyvinyl acetate, which results in products which do possess a separate layer of adhesive. An exceptionally good adhesion can be obtained by using as polymer for the adhesive coating the same polymer as that from which the plastic foam has been formed.

Polystyrene is preferably used as polymer of the coating and as polymer of the plastic foam. The invention, however, is not restricted to the use of polystyrene as vinylaromatic polymer. Use may also be made of polymers of other vinylaromatic compounds, e.g., alpha-methyl styrene, or of copolymers of vinylaromatic compounds with different vinylaromatic compounds. Other suitable copolymers of vinylaromatic compounds comprise copolymers of styrene, acrylonitrile and polybutadiene. Polymer mixtures based on vinylaromatic polymer and other polymeric substances can also be used. So called high-impact polymer compositions of said vinylaromatic polymers or copolymers with copolymerizable elastomers, e.g., polybutadiene, polyisoprene or styrene-butadiene copolymers, can also be employed according to this invention.

Suitable plastic foams, which are processed to paper/plastic-foam laminates by means of the method of the invention, are manufactured by extrusion processes. As starting materials in these processes use can be made either of foamable vinylaromatic polymer compositions containing a certain quantity of blowing agent, or of polymer compositions which do not contain a blowing agent. In the latter case the blowing agent is fed directly to the extruder and subsequently mixed therein with the already melted or plastified plastic material. When the plastic material containing the blowing agent is extruded through the extrusion die the blowing agent expands rapidly, owing to the difference in pressure, with the result that the plastic material is converted into a foam. Various blowing agents for production of plastic foams are well known and need not be enumerated here in detail. Particularly preferred for use with polystyrene are relatively low boiling vaporizable organic compounds, e.g., butanes or pentanes.

During extrusion the foamable mixtures will generally contain one or more substances for influencing the cell-size and the cell-size distribution the foam in known manner. Such substances may be, for example, compounds which as a result of chemical or thermal decomposition release a gas such as carbon dioxide or nitrogen. Of compounds of this type combinations of citric acid and sodium bicarbonate are very suitable.

By varying the amount of blowing agent and the type and amount of the substances for controlling the cell-size it is possible to produce foams which possess varying densities and cell-sizes. While the method of the invention can be employed with foams having densities in the range from 15 to 400 g./l. and cell diameter in the range from 0.05 or less to 0.5 mm., it is particularly suitable for use with plastic foams having a density of from 50 to 120 g./l. and a cell diameter in the range from 0.1 to 0.3 mm.

The films or sheets may be manufactured by any suitable extrusion process, it being possible to use dies having an annular orifice or a straight slit-shaped orifice. Annular orifices are generally suitable for producing relatively thin extrudates, as a rule less than 5 mm. thick, e.g., from 0.07 to 5 mm., while straight orifices can be advantageously used in the extrusion of sheets having a thickness of from 5 to 15 mm. or even more. The processing of the resultant extrudates to foams having smooth surfaces will normally be effected, in the case of the annular orifices, by means of the film blowing process, while foams extruded through a straight slit can be flattened off in accordance with the method described in the copending patent application, Ser. No. 534,877, filed Mar. 16, 1966, now Patent No. 3,422,172, for example by passing the sheet-like extrudates in an "S" shaped path over heated rolls. According to the method of this invention, particularly valuable paper/plastic-foam laminates can be obtained by starting from extrudates having a thickness of less than 10 mm.

The products of this invention represent a considerable improvement, due to their better foldability and to their much lower degree of brittleness, over paper/plastic-foam laminates which have been manufactured using plastic foams obtained not by extrusion but in some other way, for example by the foaming of foamable polymer particles, in which process an expansion of the blowing agent and simultaneous coalescence of the particles to form a whole is effected by heating.

The polymer-coated paper employed in the method of the invention can be manufactured in any suitable manner. In order to obtain a fully continuous coating on the paper it is advisable to coat the paper with melted or plastified polymer. This can be achieved, for example, by extruding a film of the polymer onto the paper in accordance with the so-called "extrusion coating technique." The coating can also be applied very easily to the paper by melting or sticking, i.e. by affixing a previously obtained film of the polymer to the paper either by heating the film or by heating the paper.

If the place at which the coating is applied to the paper is at a considerable distance from the place where the paper is affixed to the plastic foam the polymer coating must, of course, be heated before or at the point of the adhesion since the polymer coating must be in the plastic state at the moment of adhesion.

The paper is affixed to the plastic foam by passing the paper and the foam at the same speed along a roll or a guide face by means of which the paper is pressed against the foam. A companion roll may be arranged opposite this roll on the other side of the foam, but this is not essential.

According to the invention the plastic foams may be laminated with paper either on one side only or on both sides. In the latter case the two paper layers may be affixed to the foam simultaneously or successively. The paper/plastic-foam laminates may also be subjected to a post-expansion process. This has the effect of reducing the density of the foam, while the low degree of brittleness and the excellent rigidity and strength properties of the laminates are fully retained or are even improved. In the preferred mode, illustrated in the following example, post-expansion is obtained because the foam passes between heated rolls during the lamination step.

Figure 2:
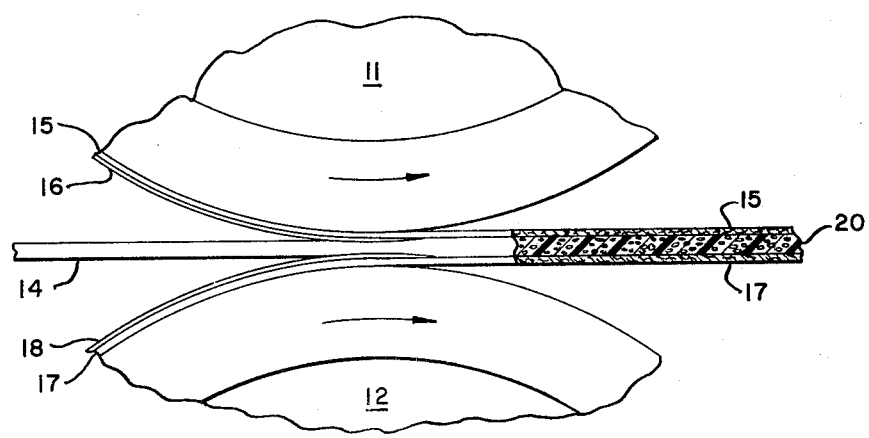

The invention is further illustrated by reference to the drawing, in which:

FIGURE 1 is a view in elevation illustrating schematically the essential part of the apparatus for carrying out the process of this invention, and FIGURE 2 is a detail of a part of FIGURE 1, illustrating the formation of a laminate according to the invention.

In the figures the identical parts are indicated by identical numerals. In the method according to this invention, webs of kraft paper 15 and 17 to which have been applied polystyrene coatings 16 and 18, respectively, are passed over heated rolls 11 and 12. Polystyrene foamed sheet 14 from an extruder passes between the nib of the rolls and is contacted under modest pressure with the adhesive layers of the two paper webs. The resulting laminate, consisting of expanded foam 20 between paper webs 15 and 17, is withdrawn to conventional take-up or cutting and stacking devices. It will be noted that the contact with the heated rolls results in some increase in the thickness of the polystyrene foam sheet. Typically the thickness of the sheet may be increased by as much as 100%.

The products obtained according to the invention are very suitable for use as substitutes for cardboard, in particular laminated corrugated board, the known applications for cardboard being adopted unaltered. Particularly suitable applications of this kind are the use of the products as thermal or acoustic insulating material, and in the packaging industry, for example for shaping to trays, cartons, and the like. Important advantages of the novel products for such uses are low permeability and insensitivity to moisture, favorable foldability and low degree of brittleness, great rigidity and strength, together with a light weight and a low cost price.

EXAMPLE

An expandable polystyrene containing 6% by weight of pentane as blowing agent was mixed with 0.5% by weight of sodium bicarbonate and 0.4% by weight of citric acid and extruded according to the film blowing process to a foamed film having a thickness of 2 mm., a density of 90 g./liter and cell-diameters of from 0.1 to 0.3 mm. The film was subsequently passed between two rolls of 20 cm. diameter placed opposite each other, together with two webs of kraft paper, one web on each side of the foam. This paper was provided with a continuous coating of high impact polystyrene containing approximately 7% by weight of rubber. The thickness of the coating was 0.05 mm., the thickness of the paper expressed in weight per m.$^2$ was 200 g./m.$^2$.

The center-to-center distance of the two rolls was controlled so that the paper was pressed modestly against the foam, and the temperature of the rolls was maintained at 145° C. The period of time during which the paper was in contact with the rolls was chosen in such a way that the polymer of the coating on the paper was heated to above the softening point.

Under the conditions described the paper was firmly affixed to the foam without the latter undergoing any deterioration in quality. The adhesion appeared particularly homogeneous, no bumps, creases, blisters or other defects which indicate a locally imperfect adhesion were visible on the surface.

The resultant product, laminated on both sides, was rigid and strong, easily foldable when grooved, and not brittle. It could easily be folded through an angle of 90° without breaking. The bending resistance, measured with a test strip 25 mm. in width in a three-point test in which the supporting points were at a distance of 60 cm. from each other, was 1800 g.

The bending resistance of a product likewise laminated on both sides, obtained in the manner described above with the use of a paper which was provided with a coating having a thickness of 0.08 cc. and under otherwise similar conditions as described hereinbefore, was 2000 g. This bending resistance was not dependent on the direction in which it was measured.

I claim as my invention:
1. A method for the manufacture of a laminate of paper and foamed plastic sheet which comprises:
  (1) contacting by simultaneously passing along a guiding surface
    (a) an extruded sheet of foamed thermoplastic vinyl-aromatic polymer composition having a thickness of at least about 0.07 mm., a density in the range from 15 to 400 g./l., and cell diameters not in excess of about 0.5 mm.; and
    (b) a sheet of paper coated on the side opposite said guiding surface with a continuous film, applied thereto in coherent form of a heat-softened thermoplastic vinyl-aromatic polymer composition in a thickness not exceeding 0.2 mm.,
  whereby the coated side of said paper is pressed against and fused with said foamed plastic sheet.
2. A method according to claim 1 wherein said first and second polymer compositions consist essentially of polystyrene.
3. A method according to claim 2 wherein said extruded sheet of plastic foam has a density of from 50 to 120 g./liter, cell diameters size of from 0.1 to 0.3 mm. and a thickness in the range of 0.5 to 10 mm., and said coating has a thickness of not more than 0.07 mm.
4. A method according to claim 2 wherein said extruded sheet of foamed plastic is simultaneously passed between two of said polymer-coated sheets of paper.

References Cited

UNITED STATES PATENTS 2,917,217  12/1959  Sisson _____ 161—161 XR

FOREIGN PATENTS 818,830  8/1959  Great Britain.

WILLIAM J. VAN BALEN, Primary Examiner

U.S. Cl. X.R.

161—159, 160, 161, 250